United States Patent [19]
McSherry et al.

[11] Patent Number: 5,221,169
[45] Date of Patent: Jun. 22, 1993

[54] ANCHOR ASSEMBLY FOR FASTENER

[75] Inventors: Thomas S. McSherry, Medford, N.Y.; Steven D. Townsend, Waterbury, Conn.

[73] Assignee: Titan Technology, Inc., Stamford, Conn.

[21] Appl. No.: 727,580

[22] Filed: Jul. 9, 1991

Related U.S. Application Data

[63] Continuation-in-part of Ser. No. 696,880, May 8, 1991.
[51] Int. Cl.$^5$ .............................................. F16B 21/00
[52] U.S. Cl. ..................................... 411/344; 411/342
[58] Field of Search ............... 411/21, 340, 342, 344, 411/345

[56] References Cited

U.S. PATENT DOCUMENTS

| | | | |
|---|---|---|---|
| 1,623,789 | 4/1937 | Hubener | 411/344 |
| 2,733,629 | 2/1956 | Vogt | 411/342 |
| 2,908,196 | 10/1959 | Apfelzweig | 411/344 |
| 3,248,994 | 5/1966 | Mortensen | 411/344 |
| 3,288,014 | 11/1966 | Mortensen | 411/344 |
| 3,707,898 | 1/1973 | Holly | 411/344 |
| 3,861,268 | 1/1975 | Jaggers | 411/340 |
| 4,997,327 | 3/1991 | Cira | 411/340 |

FOREIGN PATENT DOCUMENTS

| | | | |
|---|---|---|---|
| 149857 | 8/1920 | United Kingdom | 411/344 |
| 554416 | 7/1943 | United Kingdom | 411/340 |

Primary Examiner—Neill R. Wilson
Attorney, Agent, or Firm—Nolte, Nolte and Hunter

[57] ABSTRACT

An anchor assembly for retaining an elongated fastener member within an opening defined by a support wall having at least one concealed side. At least two elongated wire-like legs are positioned in parallel relation and a threaded apertured anchor member is slidably movable along the wire-like leg members and adapted to assume a first position parallel to the legs and to pivot toward a second position generally perpendicular to the legs when the anchor is advanced distally or when the leg members are withdrawn proximally to cause engagement therebetween. A connecting member in the form of a collar is positioned at the proximal ends of the legs and is configured and dimensioned for positioning within the opening of the support wall. The collar defines an aperture dimensioned and configured for reception of the elongated fastener member to facilitate attachment of the elongated fastener member to the anchor member through the threaded aperture when the anchor member is positioned at the distal side of the support wall and has assumed the second position generally perpendicular to the legs. The collar assures alignment of the fastener member with the aperture of the anchor member.

30 Claims, 9 Drawing Sheets

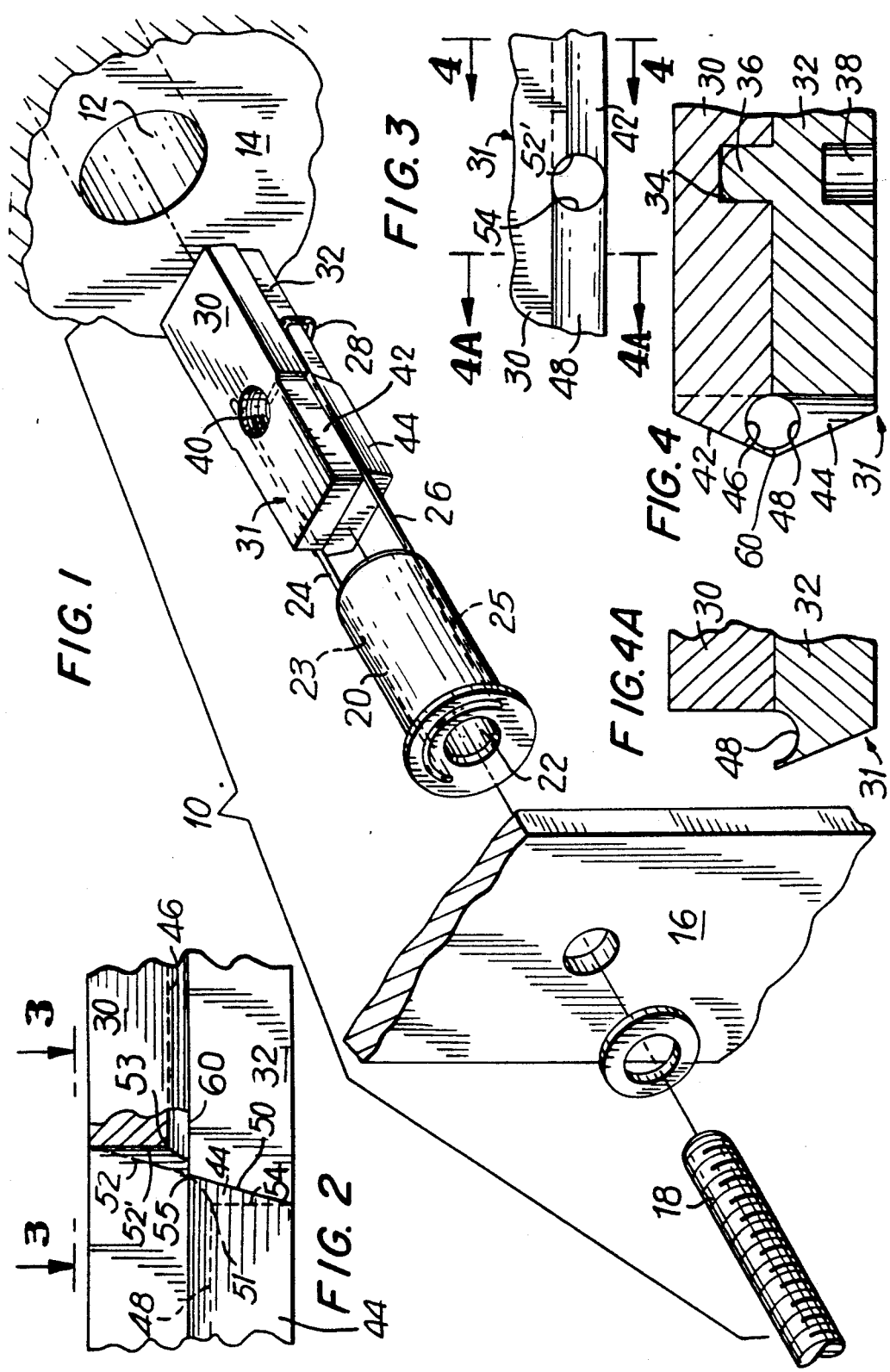

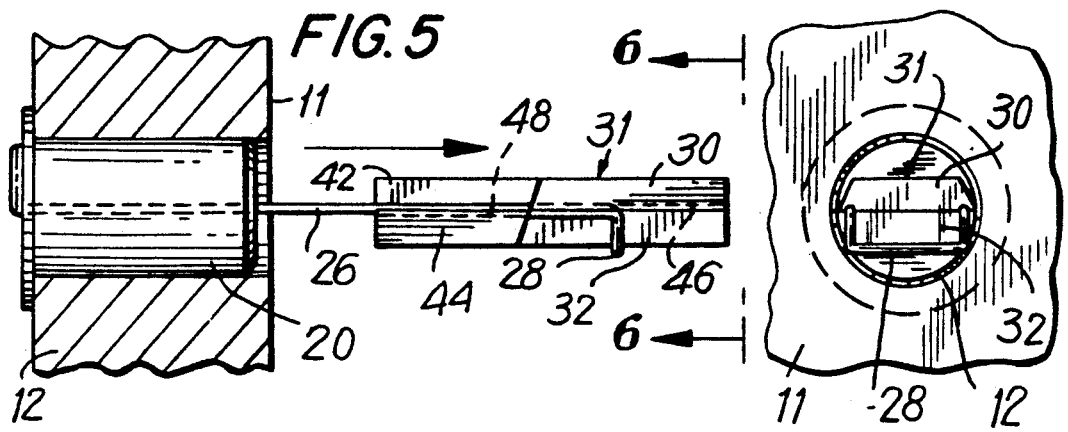
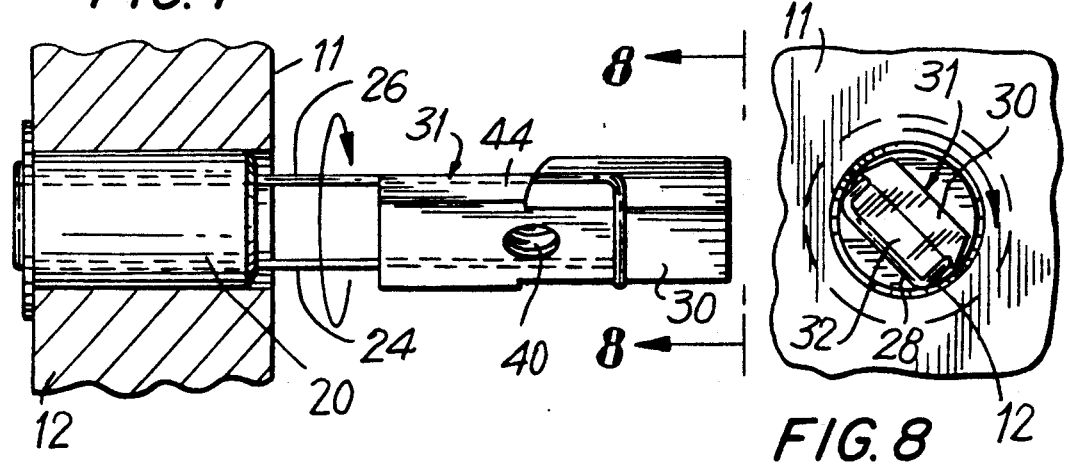
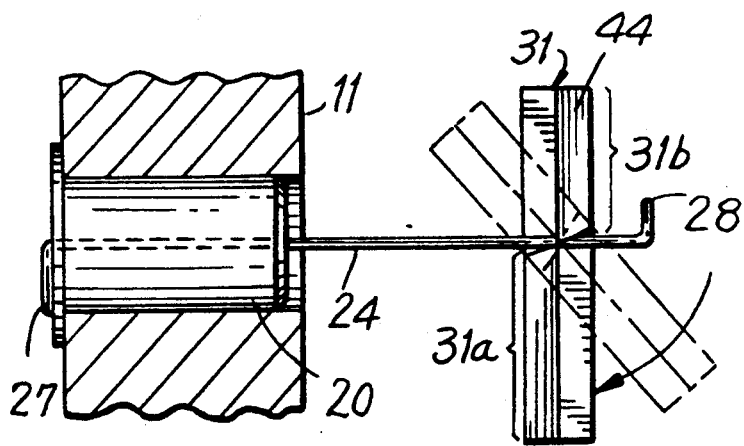

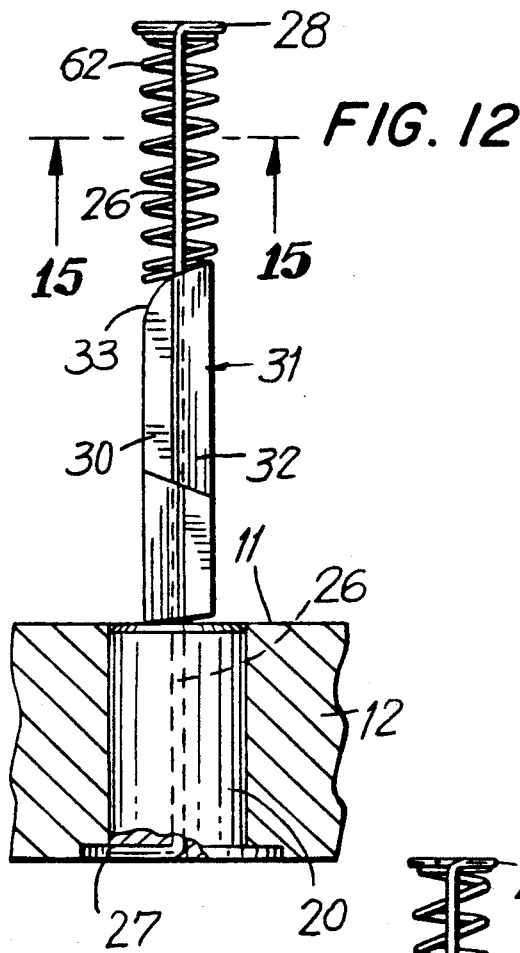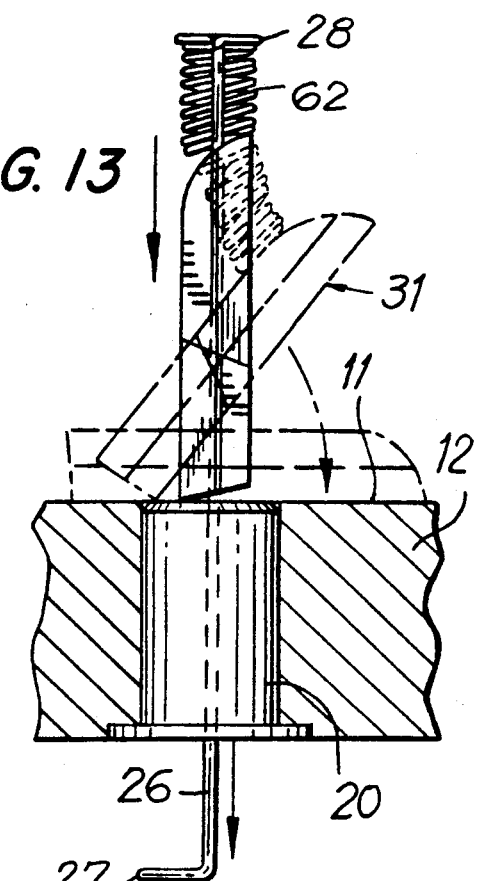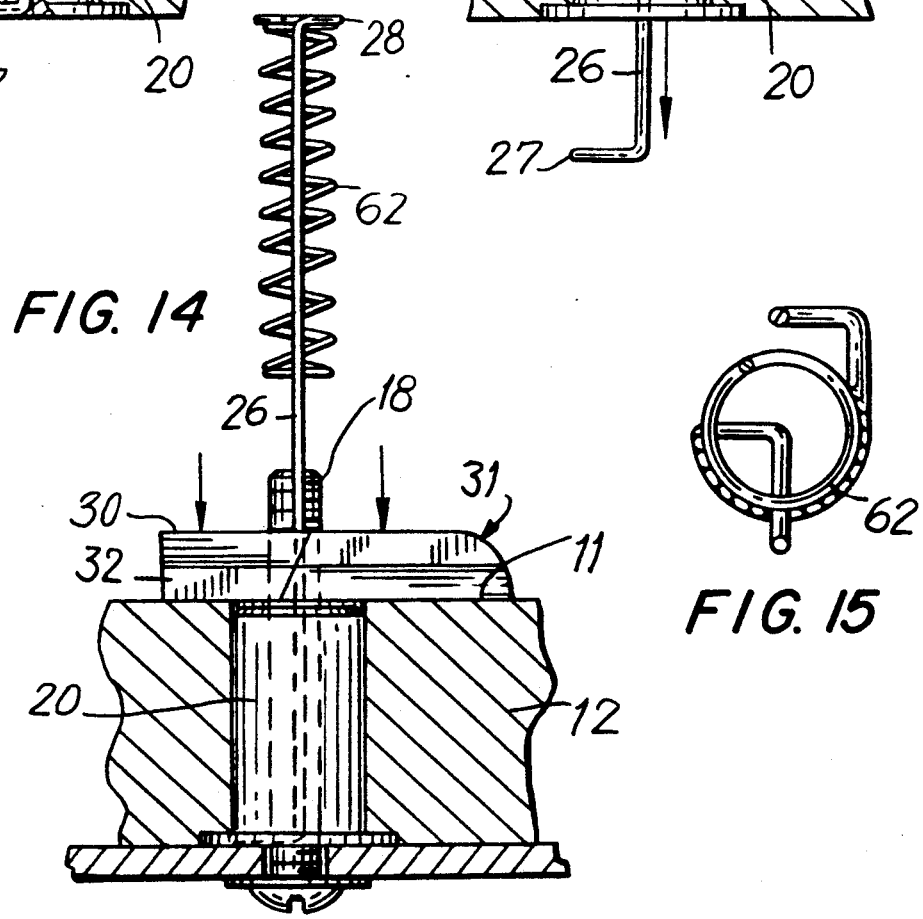

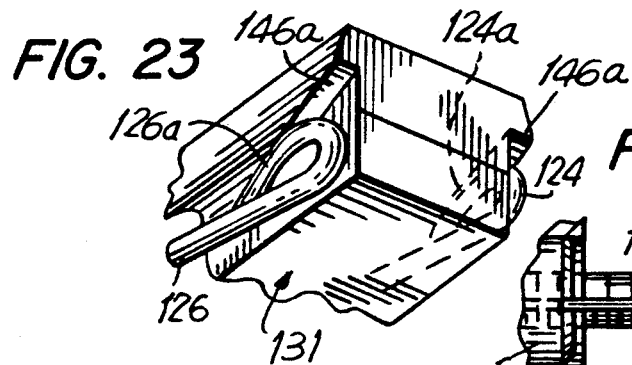
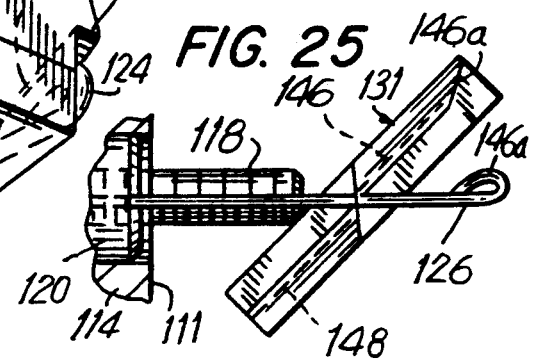
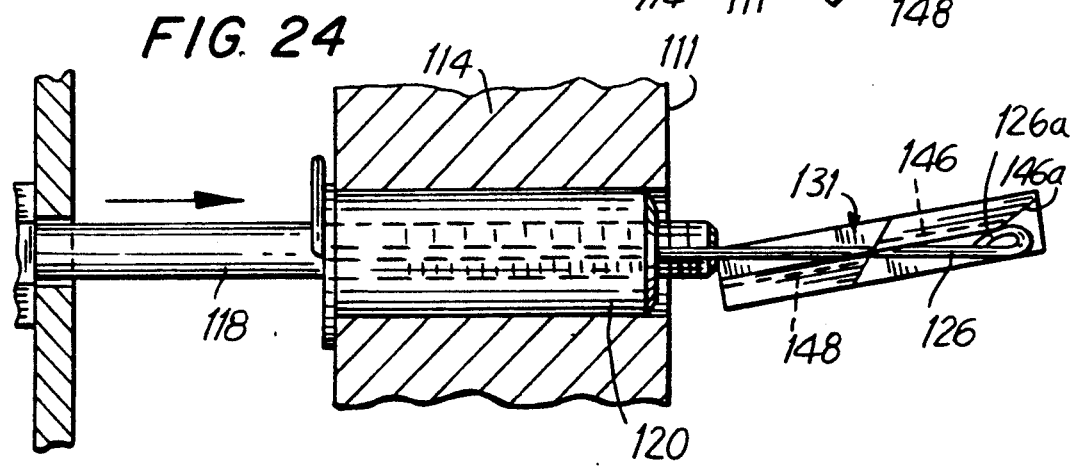
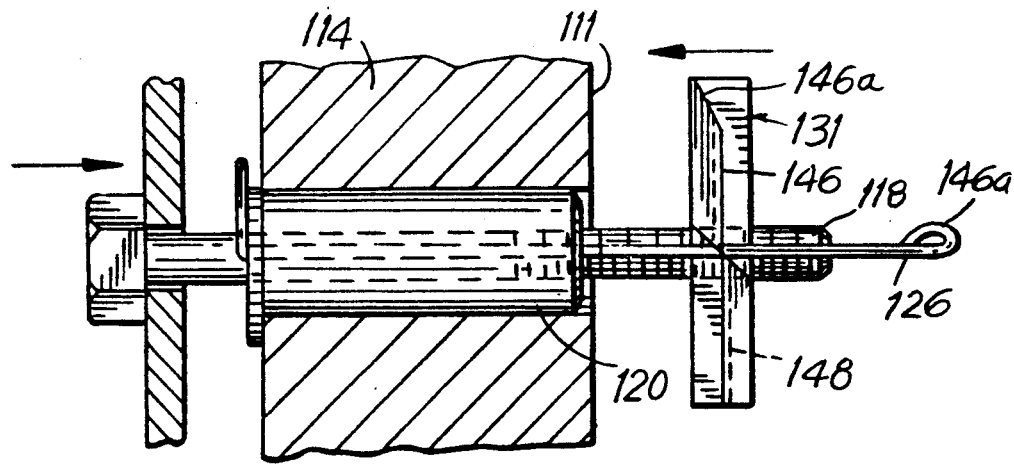

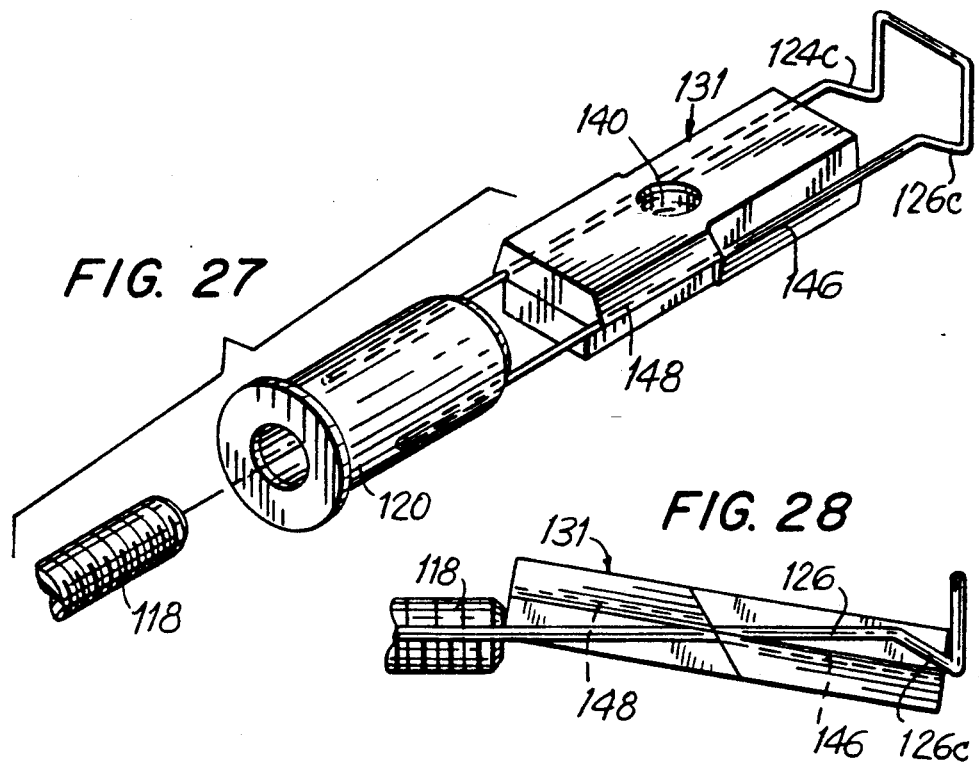
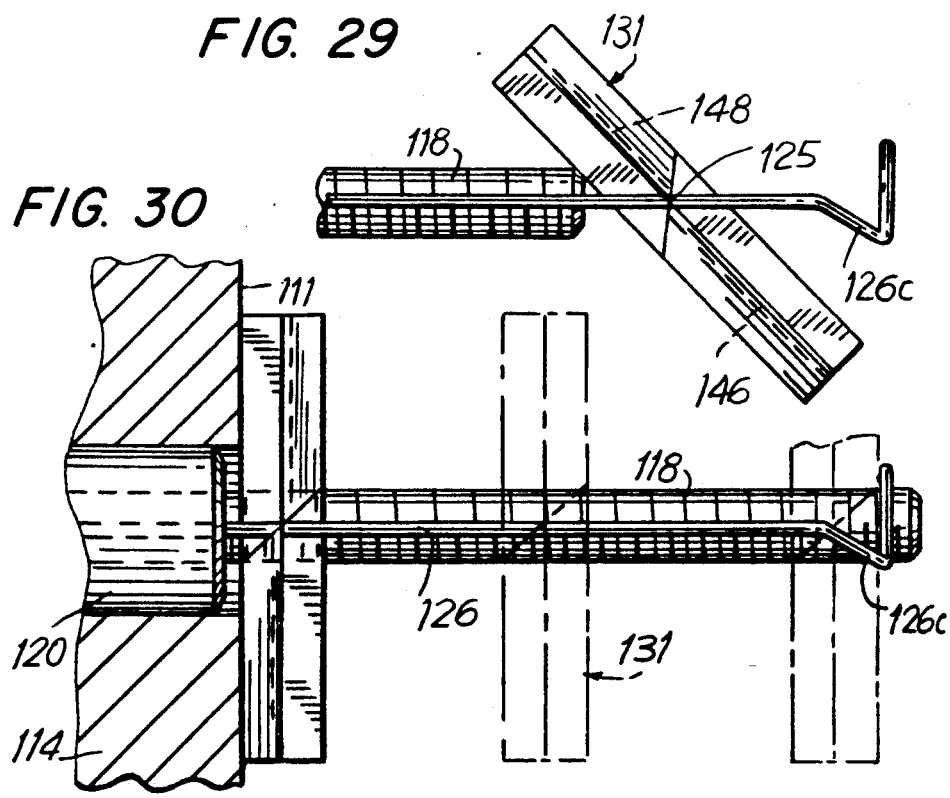

ANCHOR ASSEMBLY FOR FASTENER

CROSS REFERENCE TO RELATED APPLICATION

This application is a continuation-in-part of copending U.S. patent application Ser. No. 07/696,880 filed May 8, 1991.

BACKGROUND OF THE INVENTION

1. Field of the Invention

The present invention relates to anchoring devices for fastening objects to hollow walls. Walls of plasterboard, masonry, brick or the like are contemplated wherein elongated fasteners such as bolts, screws, etc. may be attached for further attachment of a workpiece.

2. Description of the Prior Art

Numerous devices and systems are currently available for blind attachment of objects to a support structure including hollow walls such as walls constructed of plasterboard, masonry, brick, and the like. In some instances the actual construction of the support structures such as buildings, towers, bridges or the like present instances where blind fastening is required or desirable, i.e. inserting a fastener in a support structure and providing an attachment device on the blind side.

Although the prior art is replete with devices and systems for inserting fastener reception devices behind a support member and for controlling the attachment medium such as a threaded nut, or the like, such devices do not provide the degree of blind control for the attachment device, coupled with strength requirements whereby all types of fastenings can be achieved.

U.S. Pat. No. 4,075,924 to McSherry relates to anchor assembly for fasteners wherein control of an anchor member is facilitated by a pair of leg members to which the anchor member is attached.

U.S. Pat. No. 2,908,196 to Applezweig relates to a toggle bolt which incorporates a relatively complex system to facilitate blind attachment to a support wall. A toggle element is provided for engagement by a screw.

U.S. Pat. No. 2,398,720 to Gelpcke relates to a toggle lock which includes a pair of legs and a guide member with self-spreading arms.

As noted, numerous other devices are available wherein attachment of fasteners to the blind side of a wall structure can be achieved. However, these devices often utilize complex arrangements to achieve the blind control, and such arrangements necessarily compromise the strength of the fastener system. For example, since the "nut" or other fastener reception component must first be inserted into an opening in the support structure, the dimensions of such fastener reception device will dictate the size of the wall opening. Where relatively complex devices are utilized to achieve the gripping effect, i.e. spreadable arms, channels, etc., the wall opening must be large enough to receive such device. Ideally, a solid fastener reception device would maximize strength and minimize the dimensions of the wall opening thereby providing a fastening in the same manner as if full access to the blind side of the wall were available. The present invention is directed to an anchor assembly for fasteners which achieves these operatives.

SUMMARY OF THE INVENTION

An anchor assembly for retaining a fastener member within an opening defined by support means having at least one distal side which comprises at least two elongated leg members positioned in adjacent relation, and anchor means movably supported on the leg members and pivotal to positions between a first position generally in alignment with the leg members and a second position generally transverse to the leg members.

Preferably, an anchor assembly is provided for retaining a fastener member within an opening defined by support means having at least one distal side which comprises at least two elongated leg members positioned in adjacent relation, and an anchor member defining apertures for reception of the leg members to movably support the anchor member on said leg members, the anchor member being pivotal to positions between a first position generally in alignment with the leg members and a second position generally transverse to the leg members.

In a preferred embodiment, an anchor assembly is provided for retaining a fastener member within an opening defined by support means such as a hollow wall which comprises at least two elongated leg members positioned in adjacent relation, anchor means movably supported on the leg members and pivotal to positions between a first position generally in alignment with the leg members and a second position generally transverse to the leg members. Means is associated with at least one of the leg members and the anchor means to facilitate pivotal movement of the anchor means from the first position toward the second position.

Preferably, means is provided on at least one of the leg members and the anchor member to facilitate pivotal movement of the anchor member from the first position toward the second position when at least a portion of the at least one leg member and the anchor member engage each other. The means to facilitate movement of the anchor member toward the second position is at least one shelf configured and dimensioned to engage the distal end portion of at least one of the leg members when the anchor member is advanced distally or the leg member is withdrawn proximally. The shelf may form a substantially acute angle with the at least one leg member when the anchor member is in the first position. Further, the distal end portion of at least one leg member may be configured to be engaged by the shelf when the anchor member is advanced distally along the leg members from the first position or the leg member is withdrawn proximally. The distal portion of at least one leg member may comprise a sloped portion oriented to engage the shelf in a manner to cause the anchor member to pivot toward the second position when the anchor member is advanced distally from the first position. Preferably, the anchor member includes a similarly configured shelf positioned on the side of the anchor member opposite the first shelf and similarly angularly oriented with respect to the leg members.

In one embodiment, the second leg member comprises an end portion having a sloped surface similar to the angle of the second shelf and is adapted to engage the second shelf while the distal portion of the leg member engages the first shelf when the anchor member is advanced distally from the first position or the leg member is withdrawn proximally. The engagement causes the anchor member to be pivotally rotated toward the second position. The distal portion of at least one leg member is configured such that engagement between the anchor member and the distal portion of the leg member causes the anchor member to pivot from the first position toward the second position. Further, preferably each leg member comprises means at the distal portion to engage the anchor member to cause the anchor to pivot from the first position toward the second position when the anchor is moved distally or at least one of the leg members is moved proximally.

In one preferred embodiment the two elongated leg members are positioned in adjacent parallel relation and means defining a ramped portion at the distal portion of each leg member is adapted to be engaged by the anchor member when the anchor member is advanced distally from the first position or the leg members are withdrawn proximally, so as to cause the anchor member to pivot toward the second position. The leg members are preferably of wire-like construction and a collar member is supported at the proximal end portions of the leg members and dimensioned and configured for entry into the wall opening. The collar member defines an aperture in alignment with a threaded aperture in the anchor member to facilitate reception of the elongated fastener member in the form of a threaded bolt or the like.

The anchor member may be fabricated of at least one of steel and plastic. Other suitable materials known to persons skilled in the art may be used. Further, the collar member defines a circular aperture for reception of an elongated fastener member having a cross section similar to the circular aperture. The collar member may be of steel, plastic or other suitable material, depending upon the use intended.

The wire-like members are preferably configured at the distal end portions to define sloped portions which engage the distal portion of the anchor member when the anchor member is advanced distally or when the leg members are withdrawn proximally. The engagement therebetween is such as to cause the anchor member to pivotally rotate from the first position toward the second position due to the linear and pivotal movement of said anchor member relative to the leg members while supported thereon. At least two elongated apertures are provided on the anchor member for reception of the leg members to support the anchor member for slidable and pivotal movement. The anchor member defines a track on each side for slidable reception of each said elongated leg member. The track is comprised of two portions, a first portion extending substantially over a portion of the length of the anchor member and a second portion facing opposite the first portion and extending over the remaining portion of the length of the anchor member.

The anchor assembly may be comprised of at least two component members attached to each other or it may be unitary. The component members of the anchor member may be attached to each other along a generally medial interfacial plane. Further, the track portions on the anchor member have a generally arcuate cross section adapted to receive the wire-like leg members to slidably support the anchor member thereon. The anchor member is generally rectangular in shape and defines an aperture for reception of the fastener member. Further, the openings defined by the anchor member are substantially elliptical and are defined by the respective intersections of the leg support tracks on each side of the anchor member.

The first track portion on each side of the anchor member may be of length different from the second track portion on each side of the anchor member thereby defining a pivot axis for pivotal rotation of the anchor member such that the center of gravity of the anchor member is spaced from the pivot axis such that the anchor member may pivotally rotate about the axis under influence of gravity.

An anchor assembly is also disclosed for retaining an elongated fastener member within an opening defined by a support member having at least one distal side which comprises at least two elongated leg members positioned in adjacent relation, and generally elongated anchor member movable along the leg members and adapted to assume a first position generally parallel to the leg members when the leg members are in a first orientation, and a second position generally transverse to the leg members when the position of the leg members is rotated to a second position.

In one embodiment, an anchor assembly is provided for retaining an elongated fastener member within an opening defined by a support member having at least one concealed side which comprises at least two elongated leg members positioned in generally parallel relation, an anchor member slidably movable along the leg members and adapted to assume a first position generally parallel to the leg members when the leg members are in a first orientation and a second position generally perpendicular to the leg members when the position of the leg members is rotated to a second position, and connecting means attached to the proximal ends of the leg members and configured and dimensioned for positioning within the opening of the support member. The connecting means defines an aperture dimensioned and configured for reception of the elongated fastener member to facilitate attachment of the elongated fastener member to the anchor member when the anchor member is positioned at the distal side of the support member and has assumed the second position generally perpendicular to the leg members.

The leg members are preferably connected by a wire-like bridge at the proximal and distal ends. The wire-like bridge at the proximal end facilitates manually grasping the leg members and the wire-like bridge at the distal end being positioned to engage and advance the anchor member toward the concealed side of the support member for fastening. The leg members may be configured to engage the anchor member to initiate pivotal motion toward the second position parallel to the concealed wall surface.

In a preferred embodiment, an anchor assembly is provided for retaining an elongated threaded fastener member within an opening defined by a wall portion having at least one concealed side having at least two elongated leg members positioned in generally parallel positions, the leg members each having a generally circular cross section. An anchor member has a generally elongated configuration and is slidably supported on the leg members. The anchor member has a lengthwise dimension greater than the widthwise dimension and defines a shelf extending along each side thereof along a portion of the length. Each shelf has a generally circular cross section for slidably supporting one of the leg members, the anchor member having a similarly configured shelf extending along the remaining portions thereof along the same side and having a circular cross section and facing opposite the circular cross section of the first mentioned shelves for slidable reception of the leg members. The last mentioned shelf portions are greater in dimension than the first mentioned shelf portions and define a transverse pivotal axis at the joinder of the two portions such that the center of gravity of the anchor member is spaced from the pivotal axis such that when the leg members and the anchor member are in a first orientation the gravitational moment on the anchor member causes the anchor member to remain in a horizontal orientation by engagement of the first shelf portions with the leg members and when the leg members and the anchor member are rotated approximately 180° the gravitational moment on the anchor member causes the anchor member to pivotally rotate about the pivotal axis to an orientation generally perpendicular to the leg members. This anchor member may be inserted into the wall opening and oriented parallel to the leg members such that rotating the leg members and the anchor member approximately 180° directs the gravitational moment to cause the anchor member to pivotally rotate about the axis to an orientation substantially perpendicular to the leg members.

The collar member defines two apertures for slidable reception of the proximal end portions of the leg members and is configured and dimensioned for reception by the wall opening and defines an aperture for reception of the threaded fastener member. The anchor member further defines a threaded aperture for threaded reception of the fastener member. The threaded aperture is located relative to the pivot axis such that when the anchor member is caused to be oriented substantially perpendicular to the leg members, the threaded aperture is in general alignment with the aperture defined by the collar member. The elongated members are wirelike members having a generally circular cross section. The first mentioned shelf portions of the anchor member have a generally circular cross-sectional configuration and face a first direction and the second mentioned shelf portions have a generally circular cross-sectional configuration and face opposite the direction of the first mentioned shelves whereby the first and second mentioned shelves each form a circular track on each side of the anchor member for slidable reception of the wirelike elongated leg members.

In one embodiment, the anchor member has an adhesive member on one surface for adhesive attachment to the concealed side of the wall for positioning the threaded aperture of the anchor member in alignment with the wall aperture. The adhesive member is a double-sided adhesive tape member, the first side being adhesively attached to the surface of the anchor member, the second side being capable of adhesive attachment to the distal side of the wall to secure the anchor member against the concealed side of the wall prior to insertion of the fastener member.

In another embodiment the collar member includes two distally extending members positioned adjacent the leg members and having a plurality of stepped members. The surface on each side of the anchor member is dimensioned and configured for stepped engaged reception by the stepped members whereby orienting the anchor member generally perpendicular to said leg members and advancing the anchor member toward the collar member causes the side surfaces of the anchor member to progressively engage the stepped portions defined by the distally extending members whereby the stepped portions progressively retain the anchor member in position therealong until the anchor member engages the distal surface of the wall whereby the anchor member is retained in engagement therewith by the stepped portions. Preferably the distally extending members are integrally formed with said collar member. The collar member may be constructed of metal, plastic or any suitable material. Preferably, the stepped extensions are formed integrally with the collar member.

The anchor member is preferably comprised of two component half portions attached in face to face relation. The first component half portion has sloped side portions extending from one surface thereof toward positions outwardly therefrom to define a portion of the circular track on either side thereof and the second half portion contains sloped side surfaces oriented at an angle opposite the direction of the orientation of the sloped side surfaces of the other half portion whereby the second mentioned pair of circular shelves (or shoulders) are defined for reception of the leg members. The joinder between said first and second circular shelves defining a pivot axis of rotation for said anchor member. Further, the shelves need not be circular, but of any cross-section similar or equal to the cross-section of the legs to facilitate slidable movement and pivotal movement of the anchor member, provided the wire is retained, i.e. arcuate, "V" shaped, etc.

In yet another embodiment, resilient means is positioned and adapted to facilitate pivotal rotation of said anchor member to said second position generally transverse to said leg members. The resilient means is a resilient member positioned between the distal end of the leg members and the anchor member and engages the distal end of the anchor member when the anchor member is oriented generally parallel to the leg members. Preferably, the resilient means is a coil spring positioned between bent distal end portions of the leg members and the distal end portion of the anchor member to apply a force toward the anchor member, which force resiliently assists the gravitational movement to pivotally rotate toward the position generally transverse to the leg member when the leg members are rotated to the second position. In this embodiment the anchor member is arcuately configured to facilitate engagement and release thereof by said resilient spring when said anchor member is pivotally rotated to said second position.

BRIEF DESCRIPTION OF THE DRAWINGS

Preferred embodiments of the invention are described hereinbelow with reference to the drawings wherein:

FIG. 1 is a perspective view from above of the blind anchor assembly constructed according to the invention in position for insertion into an opening of a wall;

FIG. 2 is a side view partially cut away of the anchor member shown in FIG. 1 with the leg members removed;

FIG. 3 is a side elevational view with portions cut away, taken along lines 3—3 of FIG. 2;

FIG. 4 is a cross-sectional view taken along lines 4—4 of FIG. 3 illustrating a preferred method of assembling the half portions of the anchor member and further illustrating the anchor support shelf in the distal portion of the anchor member;

FIG. 4A is a cross-sectional view taken along lines 4A—4A of FIG. 3, illustrating the anchor support shelf in the proximal portion of the anchor member;

FIG. 5 is a side elevational view, partially in cross section, of the anchor assembly and wall shown in FIG. 1 after the anchor member is inserted into the opening and the anchor member is on the concealed side of the wall;

FIG. 6 is a rear elevational view taken along lines 6—6 of FIG. 5 illustrating the anchor assembly shown in FIG. 5 after insertion into the wall opening;

FIG. 7 is a side elevational view, partially in cross section, of the anchor member and wall of FIG. 5 during rotation of the anchor assembly toward a position wherein the anchor member assumes a position perpendicular to the leg members;

FIG. 8 is a rear elevational view taken along lines 8—8 of FIG. 7 showing the concealed side of the wall and the position of the anchor member during the rotation procedure;

FIG. 9 is a side elevational view, partially in cross section, illustrating the anchor assembly as the anchor member assumes a position generally perpendicular to the leg members;

FIG. 12 is a view, partially in cross section, of an alternative embodiment of the invention wherein a resilient coil spring is positioned at the distal end of the leg members and engages one end of the anchor member to assist the anchor member in assuming a position generally perpendicular to the leg members for fastening;

FIG. 13 is a view, partially in cross section, of the alternative embodiment of FIG. 12 illustrating the anchor member in transit toward a position generally perpendicular to the leg members;

FIG. 14 is a view, partially in cross section, of the anchor assembly of FIG. 13 with a threaded fastener positioned within the collar member and threadedly attached to the anchor member securing the anchor member against the concealed side of the wall and a third member to the forward side of the wall;

FIG. 15 is a view taken along lines 15—15 of FIG. 12 illustrating part of the coil spring of the embodiment of FIG. 12;

FIG. 23 is an enlarged perspective view from below of the distal end portions of the leg members as they engage correspondingly shaped sloped surfaces formed at the distal end of the anchor member when the anchor member is advanced from the first position parallel to the leg members;

FIG. 24 is a view similar to FIG. 21 illustrating an embodiment whereby the fastener member is inserted into the collar and made to engage the proximal end of the anchor member to initiate pivotal movement thereof from the first position toward the second position;

FIG. 25 is a view similar to FIG. 24 illustrating further advancement of the elongated fastener member as the anchor member continues to pivot toward the second position;

FIG. 26 is a view similar to FIG. 22 after the workpiece has been placed in position and the fastener member has been inserted through the collar and threadedly attached to the anchor member;

FIG. 27 is a view of another alternative embodiment of the invention whereby the distal end portions of the leg members are connected by a bridge portion and the distal leg portions are configured to initiate pivotal movement of the anchor member from the first position toward the second position;

FIG. 28 is a view similar to FIG. 24 illustrating the initiation of the pivotal movement of the anchor member by engagement by the fastener member causing the anchor member to move distally from the first position;

FIG. 29 is a view similar to FIG. 25 illustrating the anchor member partially pivoted toward the second position and the fastener member in engagement therewith; and FIG. 30 is a view illustrating the anchor member in the second position perpendicular to the legs, and the fastener member positioned within the collar and the wall and threadedly received within the central fastening aperture of the anchor member.

DETAILED DESCRIPTION OF THE PREFERRED EMBODIMENTS

Figure 10:
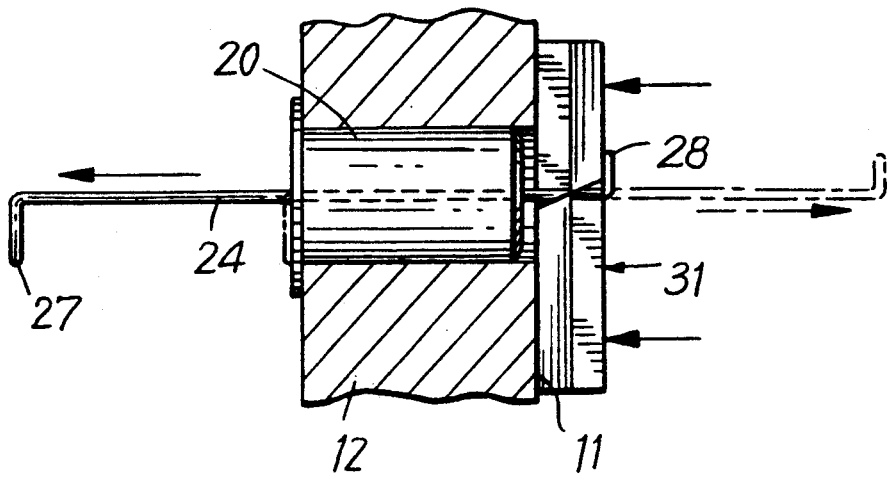
FIG. 10 is a side elevational view, partially in cross section, of the anchor assembly shown in FIG. 9 after the leg members and the anchor member have been withdrawn proximally until the anchor member is flush against the concealed side of the wall.

Referring initially to FIG. 1 a blind anchor assembly 10 constructed according to the present invention is shown in position prior to insertion into an opening 12 of a wall 14 having a concealed side. Ultimately, the anchor assembly will be attached to the wall and a third member 16 will be attached to the wall by a suitable threaded fastener 18, i.e. a bolt, as will be described.

Referring once again to FIG. 1, the anchor assembly includes collar 20 having an aperture 22 dimensioned and configured for relatively snug reception of the shank portion of the bolt 18. The collar member 20 is preferably constructed of a suitable material such as metal or plastic and includes a pair of elongated wire-like legs 24,26 slidably positioned within apertures 23,25 and extending distally through the collar 20. In the embodiment shown in FIG. 1 the wire-like legs are connected to each other by being continuous and having a bent connecting end 28 at the distal end as shown. However, the leg members may alternatively be disconnected from each other as will be seen in a later embodiment. The collar 20 and aperture 22 are configured to assure alignment between anchor member 31 and fastener 18 when the fastener is inserted into aperture 22 for threaded reception by the anchor member.

The anchor member 31 is preferably constructed of steel having an upper half 30, and a lower half 32 suitably attached to each other as shown in FIG. 4 wherein the upper half as an aperture 34 and the lower half has an extension peg 36 dimensioned, configured and positioned for interference fit reception into the aperture 34 of the upper half 30. The extension peg 36 is provided by known industrial techniques whereby material is punched from the opposite side of the member 34 to create an aperture 38 and the displaced material forms a precisely dimensioned peg 36 as shown in FIG. 4. Alternative methods of attaching the two half members of the anchor member may be utilized as being a welded as in FIG. 19, adhesives, or the like. Further, for lightweight applications, the anchor member may be constructed of a lighter material such as plastic, i.e. polypropylene, polyethylene, polycarbonate or the like. However, in such instances, it may be preferable to provide a weighted insert such as a metal insert in the portion of the anchor member which is intended to rotate under gravitational moment as will be described hereinbelow.

Referring once again to FIG. 1, the anchor member 31 includes a threaded aperture 40 appropriately dimensioned and threaded for threaded reception of the bolt 18 after the anchor member is positioned on the concealed side of the wall. Each of the half portions 30,32 of the anchor member 31 respectively include respective opposed tapered sides 42,44 shown in FIG. 4. The lower half portion 32 includes tapered sides 44 extending from the proximal end to the approximate location of threaded aperture 40 and the upper half portion 30 has oppositely shaped tapered sides 42 which extend from the approximate location of tapered aperture 40 to the distal end of the anchor member. The upper side surface 42 forms a shelf of circular cross section 46, on the upper half portion 30, and the lower side surface 48 forms a shelf 48 of similar circular cross section on the lower half 32 as shown in FIG. 4. The shelves of circular cross section 46,48 are of the same radius and form a track of radius equal to or slightly larger than the radius of the wire legs 24,26 on each side of the anchor member 31 to permit proximal and distal slidable movement of the anchor member 30 along the wire legs 24,26 as will be seen in the description which follows.

Referring now to FIG. 2, further details of the circular shaped shelves 42,44 are shown in the form of a side view of the anchor member 31 with portions cut away to illustrate the precise configuration of the shelves for reception of legs 24,25 for slidably supporting the anchor member on the elongated wire leg members 24,26. The upper half member 30 of the anchor member 31 has outwardly tapered sides 42 (one side shown in FIG. 4, but both sides are identical and opposite each other) defining circular underside downwardly facing surface 46 for slidable movement of the anchor member along the wire legs 42,46. The lower half member 32 of the anchor member 31 has tapered sides 44 defining the upwardly facing circular shelf 48.

Referring to FIG. 2, the outwardly extending tapered sides 44 on the lower member 32 are tapered at their distal ends as shown at 50 due to the intersection of circular shelf 54 with tapered side 44. This tapered end 50 also defines a circular vertical shelf 54 shown in dotted lines in FIG. 2 similar to the horizontal tapered shelf 48 shown in FIG. 4. Both shelves 48,50 intersect at 51. Similarly, the upper portion 30 of the anchor member 31 has a tapered end 52 which defines a tapered circular vertical shelf 52 similar to the circular horizontal shelf 46, joining shelf 46 at intersection 53.

Referring once again to FIG. 2, tapered side 50 of the lower shelf terminates at 60, the point at which tapered side 52 of the upper shelf begins. Thus, both tapered ends are in immediate adjacent relation to contain the wire legs 24,25 to form a continuous circular track for the wire legs, i.e. one half circular track on the lower half and one half circular track on the upper half. Thus, the wire legs are prevented from moving transversely out of the tracks. Yet the anchor member 31 is permitted to pivotally rotate between the position shown in FIG. 1 and the transverse position shown in FIG. 9, utilizing the generally circular arcuate joinder as a pivot axis.

Referring once again to FIG. 1 the location of the aperture 40 is located at the position of the rotational pivot point 60 defined by the joinder between the tapered outer side walls 42 and 44 of the anchor member 31. Further, it can be seen that both the threaded aperture 40 and the rotational pivot point 60 are offset from the center of the length of the anchor member 31 to permit the anchor member to rotate under the action of gravity when the anchor member is slidably positioned at or near the distal ends of the leg members 24,26 as will be described in connection with FIGS. 5, et seq. hereinbelow.

In operation when the anchor assembly is positioned as shown in FIG. 5 with the longer end of the anchor member 31 in the distal position the gravitational force acting on the center of gravity of the anchor member 31 will cause the anchor member to tend to rotate clockwise as shown in FIG. 5 until further rotation is prevented by the engagement of the circular shelves 46,48 on each side of anchor member 31 with the elongated wire leg members 24,26. When the anchor member is positioned at its distalmost location, shelves 48 engage the leg members and prevent pivotal rotation.

When the operator holds the collar member 20 firmly in hand the leg members 24,26 are extended distally as shown in FIG. 5 and the anchor member will assume the horizontal orientation parallel to the leg members 24,26 as shown in FIG. 5. In this position, with the anchor member 31 in the horizontal orientation the anchor member is simply inserted into the wall opening 12 until it clears the concealed side 11 of the wall 12. The relative positions of the anchor member 31 and the wall opening 12 are shown in the side view in FIG. 6 which is taken along lines 6—6 of FIG. 5. At this point, the operator rotates the entire anchor assembly by rotating the collar member 20 in either direction as shown in FIG. 7.

In particular, in FIG. 7 as viewed by the operator the anchor assembly is rotated in the counterclockwise direction. However, rotation in the clockwise direction will produce the same result. As the anchor assembly is rotated as in FIG. 7, the shelves 48 rotate to a position above leg members 24,26 and the gravitational force on the center of gravity on the anchor member 31 will produce a turning motion on the anchor member 31. This motion causes the anchor member to pivotally rotate about the pivot point 60 formed at the joinder between the horizontal and vertical circular shelves 48,54 extending outwardly from the sides of the anchor member. The turning moment will act on the anchor member 31 to cause the anchor member to rotate to the position shown in FIG. 9 which is perpendicular to the elongated wire leg members 24,26 and parallel to the concealed side 11 of wall 14. Thus, the anchor member is now in position for movement in the proximal direction to a position in engagement with the concealed side 11 of wall 14.

It will be appreciated that continued rotation of the fastener assembly past 180° from the position shown in FIG. 5 (i.e. back to the position shown in FIG. 5) will cause the gravitational moment on the anchor member to rotate the anchor member once again toward the horizontal position shown in FIG. 5. Finally, engagement of the circular shelves 48 with the leg members 24,26 will prevent further rotation of the anchor member 31 causing the anchor member to assume the horizontal position whereby the anchor assembly may be removed from the opening 12 in wall 14, if desired.

Figure 11:
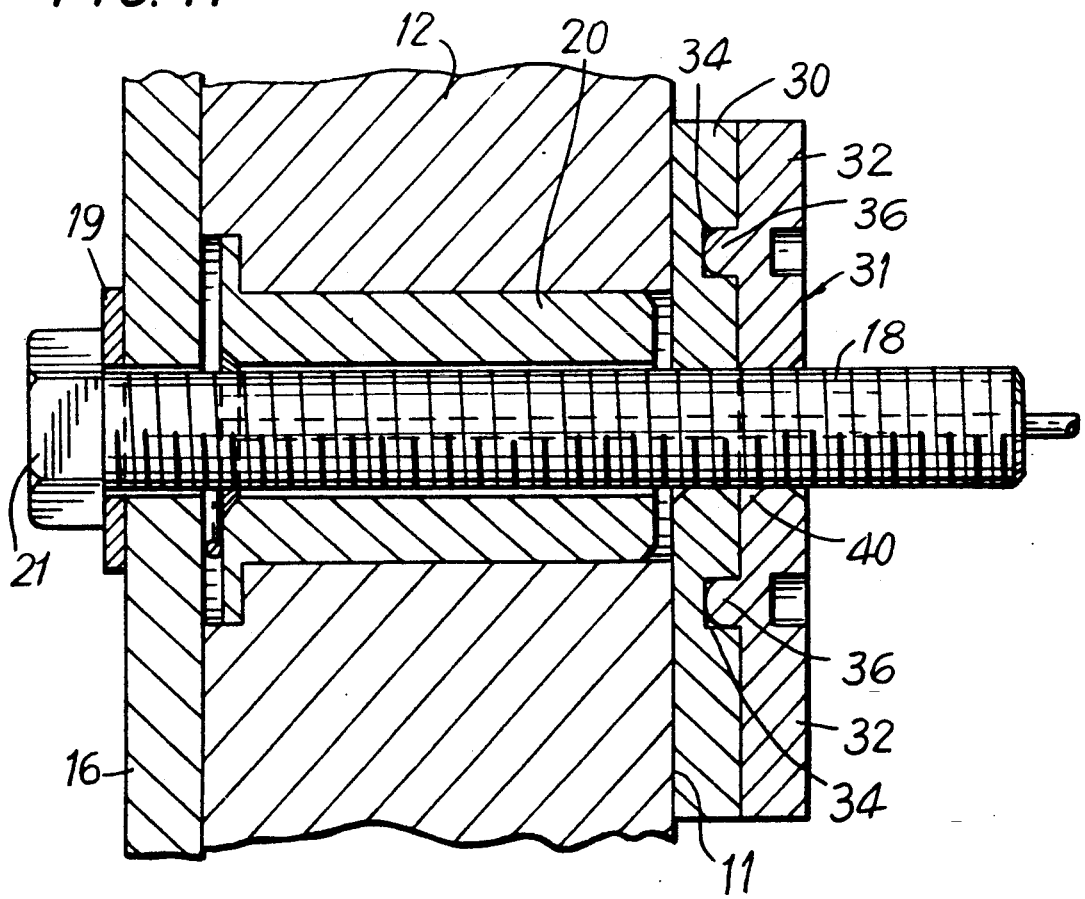
FIG. 11 is a cross sectional view of the anchor member in FIG. 10 with a threaded fastener member positioned in the collar and threadedly attached to the anchor member through the concealed side of the wall to secure a third member to the wall.

Referring now to FIG. 10, the continued operation of the anchor assembly will be described. The operator will grip the proximal end of leg members 24,26 where they are connected to form connecting loop 27. Thereafter, the connecting loop 27 is manually pulled in the proximal direction causing the distal connecting loop 28 to engage the anchor member 31 and to move it proximally until it is flush against the concealed surface 11 of wall 12. At this point threaded bolt 18 is inserted into the collar 20 and rotated to threadedly engage the anchor member 31 through the threaded opening 40. The bolt is tightened until the anchor member 31 is sufficiently tightened against the concealed side 11 of the wall 14. As shown in FIG. 11, a workpiece such as a plank 16 or other member is positioned against the wall and attached to the wall by the bolt 18 with optional washer 19 positioned between the head 21 of the bolt and the workpiece 16 depending upon the particular application or need. Any workpiece may be attached in any preferred manner.

It will be readily appreciated that the unique structure of the anchor member 31 is unique. The outwardly extending upper and lower shelves define a circular cross sectional track for the wire legs and also define a unique rotational pivot point at the joinder between the shelves on the lower half section of the anchor member and the shelves on the upper half section of the anchor member to support the anchor member on the leg members 24,26. This creates a unique arrangement whereby rotation of the anchor member to the operative position is accomplished relatively simply by rotation of the entire anchor assembly utilizing the gravitational forces and rotational moments produced thereby. Such structure produces substantial advantages over the prior art devices whereby numerous attempts have been made to produce a fastener whereby the operator may control the orientation of the blind anchor when it is located behind the concealed side of the wall from the unconcealed side.

Referring now to FIG. 11, the technique for attaching the upper half section 30 and the lower half section 32 to form the anchor member 31 is illustrated in further detail whereby pegs 36 in the lower half section 32 are attached by interference fit into apertures 34 in the upper half section 30. Thus, the lower half section may be produced out of commercial steel or molded of a suitable plastic material. The other half section may be similarly produced. Thereafter, the two half sections are positioned in adjacent relation for assembly with the leg members 24,26 in the appropriate position in engagement with one of the circular configured side shelves (i.e., tracks). The half sections are positioned and joined together thus securing the anchor member for slidable movement along the leg members 24,26 and preventing removal of the leg members from the anchor member. The aperture 40 may then be threaded after the two half sections are assembled or alternatively each half section may be threaded prior to assembly whereby after assembly of the anchor member half sections 30,32 and aperture 40 will be continuous.

The anchor member 31 may be completely assembled or integrally molded (i.e., plastic) prior to positioning of the leg members 24, 25. In such case, the leg members may be fabricated as separate members without bridge 28. Thus the leg members may be inserted into the circular apertures formed by tracks 46, 48 and thereafter bent in the form of pigtails 33 shown in FIG. 17. Optionally, other bent configurations, i.e. U-shaped, circular, etc. may be provided at the distal ends of the leg members 24, 25.

Referring now to FIG. 12 an alternative embodiment of the present invention is illustrated whereby the anchor member 31 has an arcuately configured surface 33 at the distal end and a coil spring 62 is positioned between the arcuate surface and the bent connector bridge 28 formed by the wire legs 24,26. The purpose of this configuration is to provide assistance in rotating the anchor member 31 to the position perpendicular to the leg members 24,25 when the anchor assembly is rotated. It will be seen from FIG. 13 that as the anchor assembly is rotated as shown in FIG. 7 with the first embodiment, the gravitational moment will cause rotation of anchor member 31 toward the position perpendicular to the leg members and parallel to the concealed side 11 of wall 14. In addition, coil spring 62, which is in the compressed state as shown in FIG. 12, will assist the movement of the anchor member assisting the gravitational moment by providing an offset spring force which produces a turning moment on anchor member 31. FIG. 14 illustrates the anchor member 31 of the embodiment of FIG. 12 secured in position to the wall 12 with the workpiece 16 appropriately attached in position by fastener 18. FIG. 15 illustrates a partial cross sectional view of the compressed coil spring shown in FIG. 12.

Figure 16:
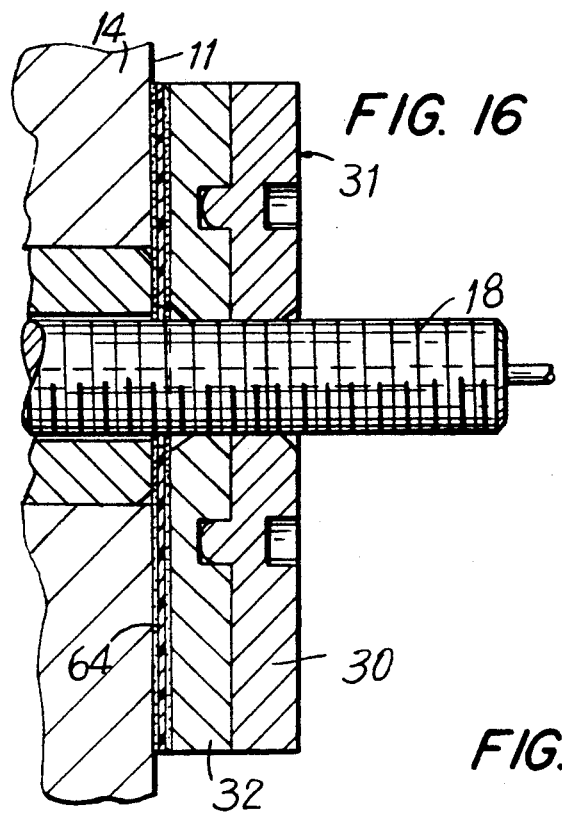
FIG. 16 is a view of an alternative embodiment of the invention illustrating the use of a double side adhesive member to preliminarily attach the anchor member to the concealed side of the wall during the fastening procedure.

Referring now to FIG. 16, there is shown still another embodiment of the invention whereby the anchor member 31 is provided with a double sided adhesive tape 64 on the side of the anchor member intended for secure engagement with the concealed surface 11 of the wall 12. The anchor member may be supplied by the manufacturer with the adhesive tape 64 attached to one side of the anchor member and the opposite side intended for attachment to the wall covered by release paper which is simply removed by the end user to activate the proximal adhesive side of the tape. Alternatively, the double adhesive sided tape may be supplied by the manufacture as a separate component with the release paper on both adhesive sides.

Figure 17:
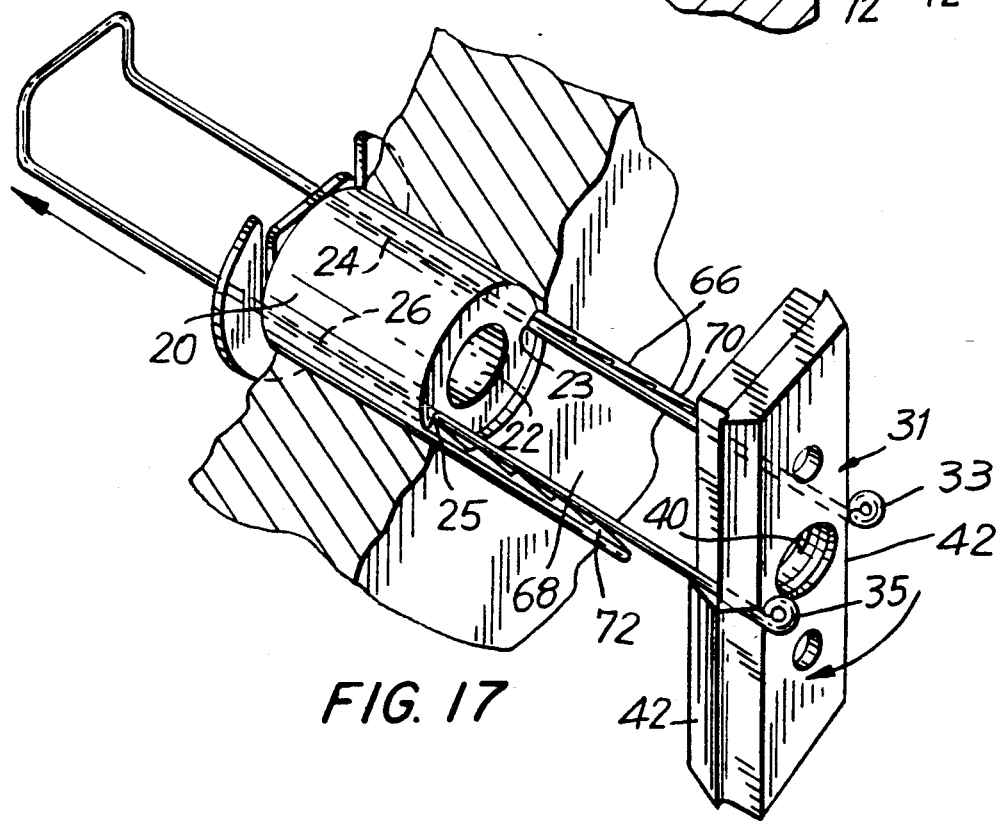
FIG. 17 is a perspective view of another alternative embodiment of the invention wherein a pair of extension members extend distally from the collar member and define a plurality of ratchet members to assist temporarily securing the position of the anchor member against the concealed side of the wall.

Referring now to FIG. 17 there is illustrated still another alternative embodiment of the invention. In this embodiment the collar 20 preferably includes distally extending leg members 68 which in turn define radially inwardly extending ratchet like steps 70,72 respectively tapered outwardly in the distal direction as shown, for engagement with the outwardly tapered surfaces 42 on both sides of anchor member 31. The similar shape and dimension of the ratchet members 70,72 are such that the wire legs 24,26 are pulled inwardly to advance the anchor member 31 inwardly toward the concealed side of wall 12 and a progressive ratchet engagement will take place between the ratchet steps 70,72 of the extensions 66,68. The outwardly extending tapered surfaces 42 of the anchor member 31 thereby progressively engage and secure the increasingly proximal position of the anchor member 31 until the anchor member 31 is firmly secured in position against the concealed side 11 of the wall 12 and retains the anchor member 31 firmly in that position by the last ratchet teeth 70,72. At this point, the threaded aperture 40 of the anchor member 31 is in alignment with the aperture 12 in wall 14 to facilitate insertion of the threaded fastener 18 for threaded engagement with the threaded aperture 40. Extensions 66,68 also serve to prevent rotation of the anchor member 31 as the bolt is threadedly engaged.

Figure 18:
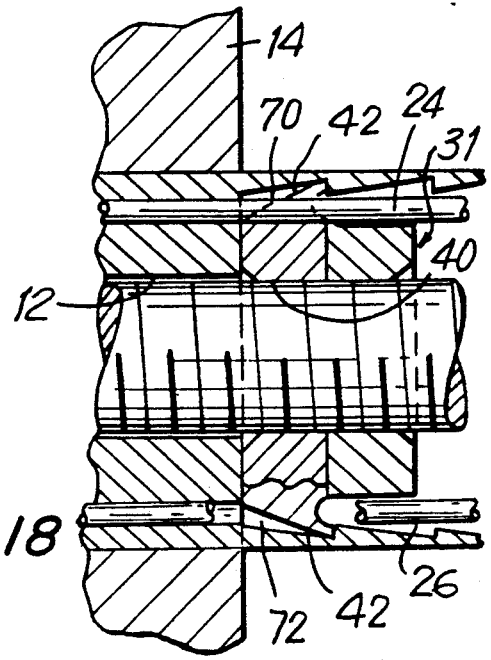
FIG. 18 is a cross sectional view of the alternative embodiment of the blind anchor assembly of FIG. 17 illustrating the engagement of the ratchet members with the anchor member to secure the anchor member in position flush against the concealed side of the wall.

It will be observed that the embodiment shown in FIGS. 17 and 18 the leg members 24,26 are alternatively configured whereby the connector loop 28 at the distal end of legs 24,26 has been eliminated and replaced by pigtails 33,35 at the distal end of each leg member 24,26, respectively. The leg members in the embodiment of FIGS. 17 and 18 are slidably positioned within apertures 23 as in the embodiment shown in FIG. 1. In FIG. 17, the leg members 24,25 and apertures 23,25 are positioned radially inward on the collar 20 to accommodate the radially outward position of the extensions 66,68. In all other respects, the anchor assembly shown in FIGS. 17,18 are identical to the anchor assembly shown in FIG. 1. Further, as in the embodiment of FIG. 1, the collar 20 may be of metal, molded plastic, or other suitable material.

Figure 19:
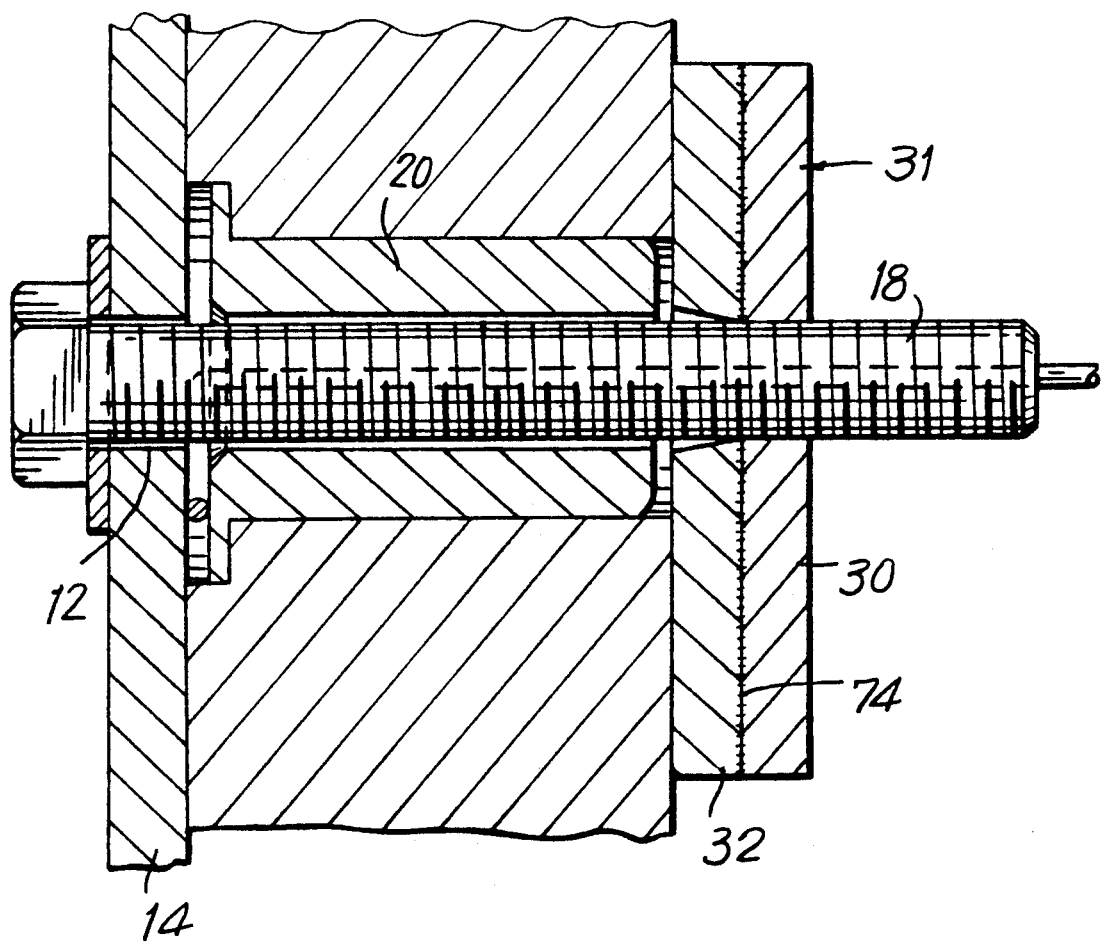
FIG. 19 is a cross sectional view of the blind anchor assembly of the present invention illustrating an alternative embodiment for attaching the half portions of the anchor member.

Referring now to FIG. 19, there is illustrated still another alternative embodiment of the invention wherein the anchor member 31 is formed by attaching half section 30 to half section 32 by a weld 74. Other suitable means of attaching the half members will come to the mind of the skilled artisan. In particular, the attachment means of the half members 30,32 will in part be determined by the material with which the anchor member is formed. For example, the anchor member may be formed of steel for heavier and commercial applications in which case the attachment technique of the half sections illustrated in FIGS. 4, 16 and 19 will be appropriate. Additionally, steel half sections may be attached by adhesives. If the anchor member is constructed of molded plastic material such as polyethylene, polypropylene, polyester, polycarbonate, or the like, the half sections of the anchor member may be attached by adhesives or the ultrasonic welding techniques. A plastic anchor member may be integrally molded in one unit. Further, a weighted insert may be added to form the heavier portion of a plastic anchor member to assist the gravitational moment. Alternatively, material may be removed from one portion as by drilling, to reduce the weight.

In general, the strength of the attachment of the half sections of the anchor member 31 will not be significant once the half sections are attached and the threaded fastener 18 is threadedly engaged with the assembled anchor member 31, since both half sections will essentially be compressed together by the threads of the fastener member and the inward force on the anchor assembly.

Figure 20:
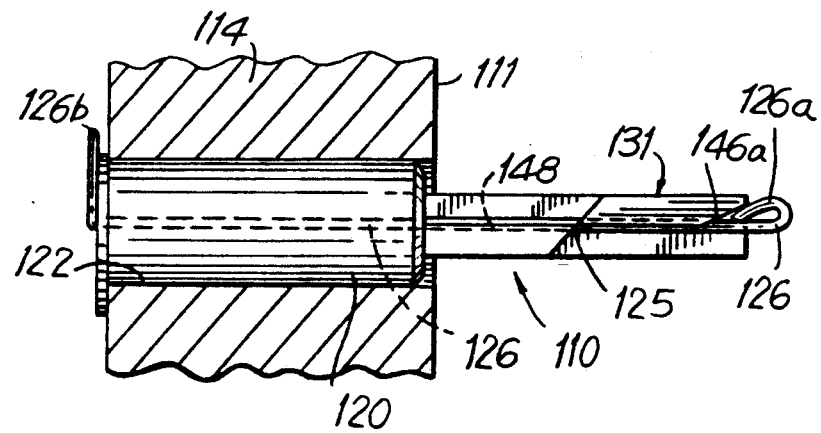
FIG. 20 is a cross-sectional view of an alternative embodiment of the present invention wherein the distal leg portions and the anchor member are shaped to initiate pivotal movement of the anchor member when the leg portions and the anchor member are made to engage each other.

Referring now to FIG. 20, an alternative embodiment of the invention is shown wherein components similar to the previous embodiments are similarly numbered, but preceded by the numeral "1". Blind anchor assembly 110 of the invention is shown in ==position for fastening within wall 114. Wire-like legs 124,126 are slidably positioned within apertures 123,125 in collar 110 similar to the previously described embodiments. The legs 124,126 also slidably support pivotal anchor member 131 through elongated apertures 147 and 149 (not shown) formed at the intersection of arcuate shelves 148 and 146 similarly to the elongated apertures formed by shelves 46 and 48 as shown in the embodiment of FIGS. 2-4. Thus, the elongated apertures 147,149 permit the free slidable and pivotal movement of anchor member 131 as disclosed in the previous embodiments. These uniquely formed apertures and the wire-like legs comprise a significant feature of the present invention.

In the embodiment of FIG. 20, the distal ends of legs 124,126 are configured to provide a sloped portion 126a,124a as shown, and the distal portion of support shelves 146 on each side are beveled at 146a as shown. Thus proximal movement of legs 124,126 causes the sloped portion 124a,126a of the legs to engage the bevelled shelves 146a as shown to initiate pivotal movement of anchor 131 from the first horizontal position shown, toward the second vertical position parallel to the distal side 111 of wall 112 as shown. As can be seen, the legs 124,126 are connected to each other at the proximal ends by bridge 126b similar to the embodiment of FIG. 17 and they are slidable within elongated apertures 147,149 of the anchor member.

Figure 22:
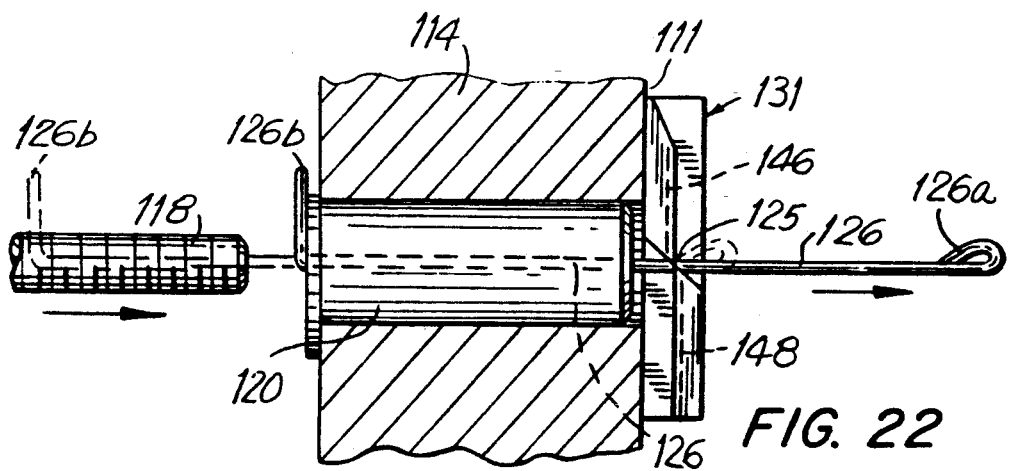
FIG. 22 is a view similar to FIG. 21 after the anchor member has been pivoted to the second position parallel to the distal side of the wall and the leg members have been advanced distally to their normal distal position.

As noted, the apertures 147,149 are formed as shown in FIGS. 2 and 3, i.e. substantially elliptical, at the interface between arcuate shelves 146 and 148. Thus, anchor member 131 is freely pivotal on the leg members and proximal movement of the cross member 126b causes engagement between the distal ends of legs 124,126 and the bevelled shelf of anchor member 131. Continued proximal movement of the legs to the position shown in dotted lines in FIG. 22 causes anchor member 131 to assume a vertical position as shown, ready for insertion of the fastener. The anchor member may be made to pivot to any desired angle to engage the surface 111 of the wall 112. In FIG. 22, the surface 111 is shown perpendicular to the leg members but may be at any other angle, i.e. the blind wall surface may form an angle with the forward wall surface. After the fastening is completed, legs 124,126 may be returned to their distal positions or removed by breaking, depending upon the particular application and the needs.

Figure 21:
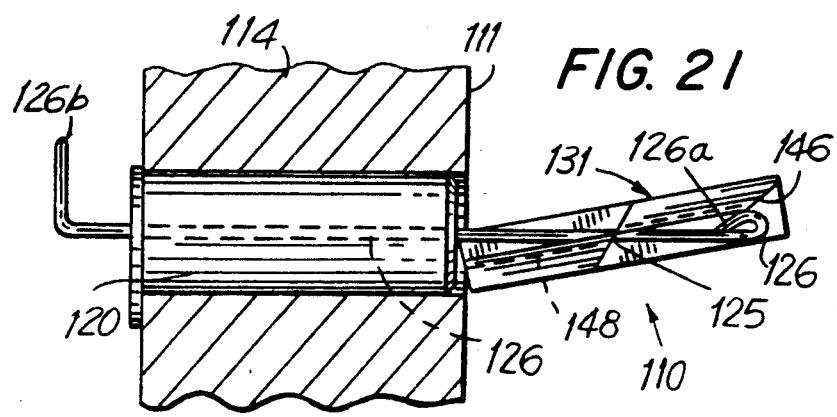
FIG. 21 is a view similar to FIG. 20 wherein the leg members have been withdrawn to facilitate engagement of the distal end portions of the leg members and the anchor member.

FIGS. 23-26 illustrate an embodiment of FIGS. 20-22 whereby in use the anchor member is pivoted toward the vertical position parallel to the distal side 111 of wall 112 by engagement of the fastener 118 when the fastener is inserted into the opening 122 in collar 120 as shown. As can be seen in the sequence shown in FIGS. 24 through FIG. 26, the first engagement takes place between the distal end of bolt 120 and the proximal end of anchor 131 when the anchor member is in the first position, i.e., parallel to the legs 124,126. This engagement causes anchor member 131 to move distally as shown such that the bevelled surfaces 146a at the distal end slidably engage legs 124,126 causing the anchor member 131 to begin pivoting upwardly toward the second position, i.e. parallel to the rear side 111 of wall 112. Continued distal movement of bolt 118 causes continued progressive engagement with anchor 131 as shown in FIG. 25 and then in FIG. 26 whereby the bolt 118 is simply threadedly inserted into the threaded aperture 140 to secure workpiece "A" to the wall 112. Optionally the excess portions of the leg members 124,126 and the bridge 126a may be removed by cutting or breaking, or they may remain in position as shown. Also, the proximal end portion of anchor member 131 may have a rounded shape if desired to facilitate smooth continuous engagement by the fastener 118.

Referring now to FIGS. 27-30, still another alternative embodiment of the invention is shown whereby the pivotal motion of the anchor member 131 is achieved by configuring the ends of the legs 124,126 as shown, i.e. each to include a sharp bevelled section 124c,126c which are engaged by the distal portions of respective shelves 146. Since the sharply sloped portions 124c,126c of the distal ends of legs 124,126 readily provoke pivotal motion of anchor member 131 as shown in FIG. 28, the need for providing a bevelled shelf such as 146a as in FIGS. 23-26 is obviated. Thus in the embodiment of FIGS. 27 through 30, the anchor member 131 may be pivotally rotated from the first, or horizontal position shown in FIG. 27 (i.e. parallel to the legs 124,126) to the second, or vertical fastening position shown in FIG. 30 wherein the anchor is parallel to the rear side 111 of wall 112, all by engagement of bolt 118 as shown in the sequence from FIG. 28 through FIG. 30. The bolt 118 as threadedly engaged with anchor member 131 through aperture 140 as shown in FIG. 30 to attach a workpiece or for other known uses.

It will be appreciated that the bevelled shelf 146a in the embodiment of FIGS. 20-22 can be provided on one side or both sides of anchor 131. Also in the embodiment of FIGS. 27-30 the sharp bevelled leg portions 124c,126c can be provided on either or both legs. In either arrangement the anchor member 131 will be effectively pivotally rotated due to the particularly uniquely shaped elongated apertures 147,149 which permit slidable and pivotal motion of the anchor 131 while retaining the leg members 124,126 therein. These apertures are generally elliptical as shown in further detail in FIGS. 2-4, and are formed by the intersection of the arcuate shelves as described in connection with FIGS. 2-4. Thus, it can be seen that the present invention is directed generally toward slidably pivotally supported anchor 131 so as to pivotally rotate freely by engagement between the anchor 131 and at least one of the legs 124,126.

It will be understood that the embodiments shown in FIGS. 20 through 30 may be identical in all other respects to the previous embodiments as described hereinabove. for example, the fabrication materials may be the same and the anchor member may be fabricated in the form of two half sections joined as described hereinabove, or alternatively, as a unitary member as described hereinabove. Variations and alternative configurations may be made by persons skilled in the art without departing from the scope of the invention as defined by the claims.

The advantages of the present anchor assembly will be readily apparent to persons skilled in the art. Some of the advantages which readily come to mind are as follows. The solid construction of the anchor member facilitates fabrication of a high strength anchor member and provides substantially increased fastener force capability as opposed to such anchor members in the prior art which utilized channel members, threaded nuts, plates, or the like. In addition, the solid configuration of the anchor member and the substantial fastener force capability does not require wall openings of substantially greater dimensions to support a high strength anchor member as otherwise would have been applicable in the prior art. Thus, the widthwise dimension of the anchor member may be extremely close to the actual size of the aperture in the wall, thus making it possible to maximize the size of the threaded fastener in comparison to the size of the wall opening. This is particularly due to the unique method of supporting the anchor member for slidable and pivotal motion on relatively thin wire-like legs as shown. For example, in prior art anchor assemblies utilizing anchor members such as threaded fasteners, threaded nuts or the like, a typical anchor member would be capable of carrying a force of 1,200 pounds with the maximum size opening, i.e. greater than one half inch. An example of the present anchor assembly utilizing a solid anchor member 31 which accepts a ⅜ size bolt will carry a force of approximately 10,500 pounds. An anchor member which accepts a one-half inch size bolt will carry a force of approximately 11,200 pounds. Further the strength may vary even greater by changing the material with which the anchor member is fabricated.

It will be clear to persons skilled in the art that the utilization of a solid fastener will minimize the size of the anchor member and will therefore minimize the size of the wall opening and will minimizing the size of the threaded fastener with greater force carrying capability of the anchor assembly. Such solid anchor members could not be utilized in the manner disclosed herein due to the difficulties involved in facilitating control of the position of the anchor member behind the concealed side of the wall. The present invention makes such control possible and therefore makes it possible to significantly increase the force carrying capability of the anchor assembly.

We claim:

1. An anchor assembly for retaining a fastener member within an opening defined by support means which comprises:
    a) at least two elongated leg members;
    b) means for supporting said two elongated leg members in adjacent substantially parallel relation;
    c) anchor means movably supported on said leg members, and pivotal to positions between a first position generally in alignment with said leg members and a second position generally transverse to said leg members, said anchor means defining track means on each side for movably supporting said anchor means on said members; and
    d) means associated with at least one of said leg members and said anchor means to facilitate pivotal movement of said anchor means from said first position toward said second position.

2. An anchor assembly for retaining a fastener member within an opening defined by support means having at least one distal side which comprises:
    a) at least two elongated leg members;
    b) means for supporting said two elongated leg members in adjacent substantially parallel relation;
    c) an anchor member movably supported on said leg members and pivotal to positions between a first position generally in alignment with said leg members and a second position generally transverse to said leg members, said anchor member defining track means on each side for movably supporting said anchor member on said leg members; and d) means on at least one of said leg members and said anchor member to facilitate pivotal movement of said anchor member from said first position toward said second position when at least a portion of said at least one leg member and said anchor member engage.

3. The anchor assembly according to claim 2 wherein said means to facilitate movement of said anchor member toward said second position is at least one shelf configured and dimensioned to engage the distal end portion of at least one of said leg members when said anchor member is advanced distally or said leg member is withdrawn proximally.

4. The anchor assembly according to claim 3 wherein said shelf forms a substantially acute angle with said at least one leg member when said anchor member is in said first position.

5. The anchor assembly according to claim 4 wherein said distal end portion of at least one leg member is configured to be engaged by said shelf when said anchor member is advanced distally along said leg members from said first position or said leg member is withdrawn proximally.

6. The anchor assembly according to claim 5 wherein said distal portion of at least one leg member comprises a sloped portion oriented to engage said shelf in a manner to cause said anchor member to pivot toward said second position when said anchor member is advanced distally from said first position.

7. The anchor assembly according to claim 6 wherein said anchor member includes a similarly configured shelf positioned on the side of said anchor member opposite said first shelf and similarly angularly oriented with respect to said leg members.

8. The anchor assembly according to claim 7 wherein said second leg member comprises an end portion having a sloped surface similar to the angle of said second shelf and adapted to engage said second shelf while said distal portion of said leg member engages said first shelf when said anchor member is advanced distally from said first position or said leg member is withdrawn proximally, said engagement thereby causing said anchor member to be pivotally rotated toward said second position.

9. The anchor assembly according to claim 8 wherein the distal portion of at least one leg member is configured such that engagement between said anchor member and said distal portion of said leg member causes said anchor member to pivot from said first position toward said second position.

10. The anchor assembly according to claim 9 wherein each said leg members comprises means at the distal portion to engage said anchor member to cause said anchor to pivot from said first position toward said second position when said anchor is moved distally or at least one of said leg members is moved proximally.

11. The anchor assembly for retaining a fastener member within an opening defined by support means having at least one distal side which comprises at least:
a) at least two elongated leg members positioned in adjacent parallel relation;
b) an anchor member defining at least one aperture on each side for reception of said leg members to movably support said anchor member on said leg members in a manner to be pivotal to positions between a first position generally in alignment with said leg members and a second position generally transverse to said leg members; and c) means defining a ramped portion at the distal portion of each said leg members adapted to be engaged by said anchor member when said anchor member is advanced distally from said first position or said leg members are withdrawn proximally, so as to cause said anchor member to pivot toward said second position.

12. An anchor assembly for retaining a fastener member within an opening defined by a support wall having at least one distal side which comprises:
a) at least two elongated wire-like leg members positioned in adjacent relation;
b) an anchor member movably supported on said leg members and pivotal to positions between a first position generally in alignment with said leg members and a second position generally transverse to said leg members, said anchor member defining an opening for reception of an elongated fastener member;
c) means on at least one of said anchor member and said leg members to facilitate pivotal movement of said anchor member from said first position towards said second position when said anchor member is advanced distally or said leg members are withdrawn proximally; and
d) a collar member supported at the proximal end portions of said leg members and dimensioned and configured for entry into the wall opening, said collar member defining an aperture in alignment with said aperture in said anchor member to facilitate reception of said elongated fastener member.

13. The anchor assembly according to claim 12 wherein said aperture in said anchor member is threaded for reception of an elongated threaded fastener member.

14. The anchor member according to claim 13 wherein said fastener member is a threaded bolt.

15. The anchor assembly according to claim 14 wherein said threaded aperture in said anchor member is located at approximately the same location as the pivot axis of said anchor member.

16. The anchor assembly according to claim 15 wherein said anchor member is fabricated of at least one of steel and plastic.

17. The anchor assembly according to claim 16 wherein said collar member defines a circular aperture for reception of an elongated fastener member having a cross section similar to said circular aperture.

18. The anchor assembly according to claim 17 wherein said wire-like leg members are slidably positioned within apertures defined by said collar member to permit said leg members to be moved in distal and proximal directions.

19. The anchor assembly according to claim 18 wherein said wire-like members are configured at the distal end portions to define sloped portions which engage the distal portion of said anchor member when said anchor member is advanced distally or when said leg members are withdrawn proximally, said engagement therebetween being such as to cause said anchor member to pivotally rotate from said first position toward said second position due to the linear and pivotal movement of said anchor member relative to said leg members while supported thereon.

20. The anchor assembly according to claim 19 wherein said anchor member defines at least two elongated apertures for reception of said leg members to support said anchor member for slidable and pivotal movement.

21. The anchor assembly according to claim 20 wherein said anchor member defines a track on each side for slidable reception of each said elongated leg members.

22. The anchor assembly according to claim 21 wherein each said track is comprised of two portions, a first portion extending substantially over a portion of the length of said anchor member and a second portion facing opposite said first portion and extending substantially over the remaining portion of the length of said anchor member.

23. The anchor assembly according to claim 22 wherein said anchor member is comprised of at least two component members attached to each other.

24. The anchor assembly according to claim 23 wherein said component members of said anchor member are attached to each other along a generally medial interfacial plane.

25. The anchor assembly according to claim 24 wherein said leg members are wire-like members having an arcuate cross sectional configuration.

26. The anchor assembly according to claim 25 wherein each said track portions on said anchor member have a generally arcuate cross section adapted to receive said wire-like leg members to slidably support said anchor member thereon.

27. The anchor assembly according to claim 26 wherein said anchor member is at least one of generally rectangular and square configuration.

28. The anchor assembly according to claim 27 wherein said anchor member defines an aperture for reception of the fastener member.

29. The anchor assembly according to claim 28 wherein said elongated openings defined by said anchor member are substantially elliptical and are defined by the respective intersections of said leg support tracks on each side of said anchor member.

30. The anchor assembly according to claim 29 wherein said first track portion on each side of said anchor member is of length different from said second track portion on each side of said anchor member thereby defining a pivot axis for pivotal rotation of said anchor member, the center of gravity of said anchor member being spaced from said pivot axis such that said anchor member may pivotally rotate about said axis under influence of gravity.

* * * * *